US012573672B2

(12) United States Patent
Mossinghoff et al.

(10) Patent No.: US 12,573,672 B2
(45) Date of Patent: Mar. 10, 2026

(54) SWITCH AND BATTERY SYSTEM

(71) Applicant: Blue Origin Manufacturing, LLC, Huntsville, AL (US)

(72) Inventors: Wes Mossinghoff, Overland Park, KS (US); Jeff Burgess, Grandview, MO (US); Saad Sohail, Grandview, MO (US); Anthony Carey, Grandview, MO (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 872 days.

(21) Appl. No.: 17/751,921

(22) Filed: May 24, 2022

(65) Prior Publication Data

US 2022/0376310 A1 Nov. 24, 2022

Related U.S. Application Data

(60) Provisional application No. 63/192,164, filed on May 24, 2021.

(51) Int. Cl.
H01M 10/42 (2006.01)
H01M 10/44 (2006.01)
(Continued)

(52) U.S. Cl.
CPC ....... H01M 10/425 (2013.01); H01M 10/441 (2013.01); H01M 50/269 (2021.01);
(Continued)

(58) Field of Classification Search
CPC ............. H01M 10/425; H01M 10/441; H01M 50/269; H01M 50/30; H01M 2010/4271;
(Continued)

(56) References Cited

U.S. PATENT DOCUMENTS

2014/0184162 A1 7/2014 Takahash et al.
2016/0249919 A1* 9/2016 Savage ............... H01M 10/613
227/175.1
(Continued)

FOREIGN PATENT DOCUMENTS

CN 207977250 U * 10/2018
EP 2479819 A2 * 7/2012 .......... H01M 50/249
(Continued)

OTHER PUBLICATIONS

International Search Report and Written Opinion in corresponding PCT/US2022/030645, dated Sep. 16, 2022.
(Continued)

*Primary Examiner* — Muhammad S Siddiquee
(74) *Attorney, Agent, or Firm* — Knobbe, Martens, Olson & Bear, LLP

(57) ABSTRACT

A switch assembly for a battery module comprises a base unit, a first plug, and a second plug. The base unit defines a socket in which are located first and second positive contacts and first and second negative contacts. The first plug is configured to be inserted into the socket and comprises a first connector operable to connect the first positive contact to the second positive contact and a second connector operable to connect the first negative contact to the second negative contact when the first plug is inserted into the socket. The second plug comprises a connector operable to connect only the first positive contact to the second negative contact when the second plug is inserted into the socket.

31 Claims, 15 Drawing Sheets

(51) Int. Cl.

| | |
|---|---|
| *H01M 50/269* | (2021.01) |
| *H01M 50/30* | (2021.01) |
| *H01R 29/00* | (2006.01) |

(52) U.S. Cl.
CPC ............ *H01M 50/30* (2021.01); *H01R 29/00* (2013.01); *H01M 2010/4271* (2013.01)

(58) Field of Classification Search
CPC .. H01M 50/50; H01M 50/271; H01M 50/213; H01M 50/298; H01M 50/574; H01R 29/00; H02J 7/0042; H02J 7/0045; Y02E 60/10
See application file for complete search history.

(56) References Cited

U.S. PATENT DOCUMENTS

| | | | |
|---|---|---|---|
| 2019/0103639 A1 | 4/2019 | Guglielmo et al. | |
| 2019/0288526 A1 | 9/2019 | Jaensch et al. | |
| 2020/0343516 A1 | 10/2020 | Harris et al. | |
| 2022/0302561 A1* | 9/2022 | Harris ................. | H01M 50/296 |

FOREIGN PATENT DOCUMENTS

| | | | |
|---|---|---|---|
| EP | 3644408 | 4/2020 | |
| KR | 20100070170 | 6/2010 | |
| KR | 20190122477 | 10/2019 | |
| WO | WO 94/11162 | 5/1994 | |
| WO | WO-2022028399 A1 * | 2/2022 | ........ H01M 10/0445 |
| WO | WO 2022/251158 | 12/2022 | |

OTHER PUBLICATIONS

Extended European Search Report dated Mar. 3, 2025 in Application No. 22811946.7, in 9 pages.

* cited by examiner

500

501 — Provide Socketed Base Unit with Positive and Negative Contacts

502 — Insert First or Second Plug into the Socket of Base Unit

SWITCH AND BATTERY SYSTEM

RELATED APPLICATIONS

The present application claims priority of U.S. Provisional Patent Application Ser. No. 63/192,164 filed on May 24, 2021, and entitled "SWITCH AND BATTERY SYSTEM," which is hereby incorporated in its entirety by reference herein.

BACKGROUND

Batteries used for high power systems often have to be manufactured to fit specific voltage ratings. Such batteries often cannot be readily switched between different voltages because conventional circuits for changing different voltage levels of a battery require complex circuitry and risk electrical arcing when switching. These reduce the lifetime of the battery. Additionally, accidental switching of voltage levels of the battery could damage any system connected to the battery. Thus, it is common for an operator of different types of battery-powered equipment, which may operate at different voltages, to inventory multiple types of batteries specific for each application.

Further, batteries used for high power systems are typically lithium-ion batteries, which often present fire risks. These risks are exacerbated when the batteries are used for mission-critical systems, such as on military vehicles, marine vehicles, or the like. The most common source of lithium-ion battery fires is charging batteries that have been severely over discharged. An overly discharged battery may cause a gate of a semiconductor device, such as a MOSFET, to have a reference voltage that is too high so that once the previously overly discharged battery is charged, the reference voltage remains high. This causes the semiconductor device to remain on and allow current to continue to flow into the now charged battery, thereby causing the battery to overcharge and become unstable.

The background discussion is intended to provide information related to the present invention which is not necessarily prior art.

SUMMARY

The present invention solves the above-described problems and other problems by providing a switch assembly for a battery module, a method of configuring a battery module, and/or a battery module that enables secure switching between different voltage levels that avoids accidental damage to connected systems and that reduces risks associated with charging overly discharged batteries.

A switch assembly for a battery module according to an embodiment of the present invention comprises a base unit, a first plug, and a second plug. The base unit defines a socket in which are located first and second positive contacts and first and second negative contacts. The first plug is configured to be inserted into the socket and comprises a first connector operable to connect the first positive contact to the second positive contact and a second connector operable to connect the first negative contact to the second negative contact when the first plug is inserted into the socket. The second plug comprises a connector operable to connect only the first positive contact to the second negative contact when the second plug is inserted into the socket.

Another embodiment of the invention is a method of configuring a battery module to operate in one of at least two modes. The method comprises providing a base unit defining a socket in which are located first and second positive contacts and first and second negative contacts; and inserting into the socket either a first or second plug, wherein the first plug comprises a first connector operable to connect the first positive contact to the second positive contact and a second connector operable to connect the first negative contact to the second negative contact when the first plug is inserted into the socket, wherein the second plug comprises a connector operable to connect only the first positive contact to the second negative contact when the second plug is inserted into the socket.

A battery module constructed according to an embodiment of the present invention comprises a first collection of battery cells, a second collection of battery cells, a negative terminal, a base unit, a first plug, and a second plug. The first collection of battery cells includes a positive bus and a negative bus associated therewith. The second collection of battery cells includes a positive bus and a negative bus associated therewith. The negative terminal is configured to connect to one of the negative buses of the collections of battery cells. The base unit defines a socket in which are located first and second positive contacts configured to connect to the positive buses of the first and second collections of battery cells, and first and second negative contacts configured to connect to the negative buses of the first and second collections of battery cells.

The first plug is configured to be inserted into the socket and comprises a first connector operable to connect the first positive contact to the second positive contact and a second connector operable to connect the first negative contact to the second negative contact when the first plug is inserted into the socket. The second plug comprises a connector operable to connect only the first positive contact to the second negative contact when the second plug is inserted into the socket.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
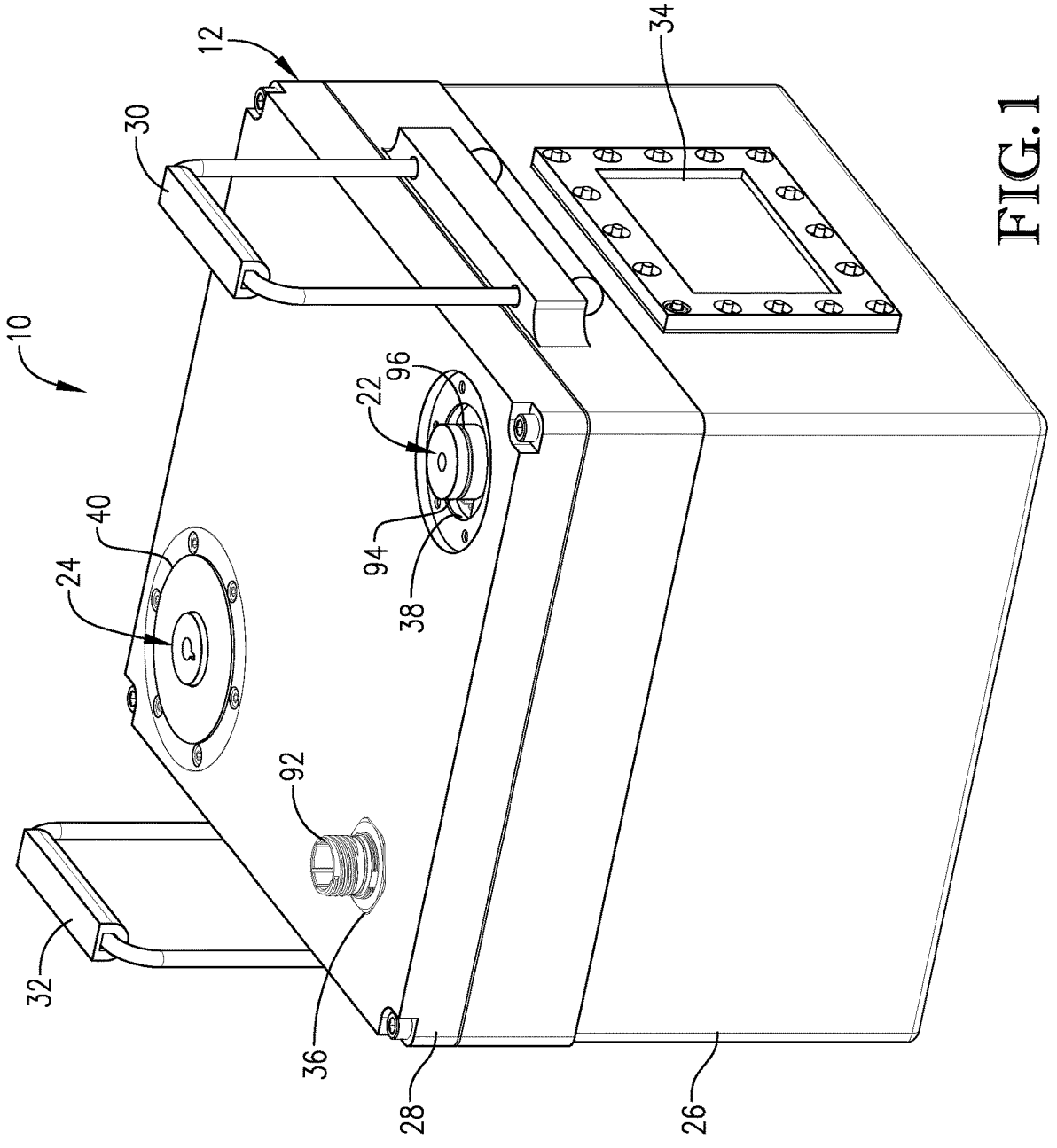
FIG. 1 is a perspective view of a battery module constructed in accordance with embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to FIG. 1, a battery module 10 constructed in accordance with an embodiment of the present invention is illustrated. The battery module 10 is operable to connect to and provide power to an external system. The battery module 10 may be capable of providing, for example, a nominal voltage of 24 V with a current up to around 1100 A or a discharge current of 180 A. In another mode, the battery module 10 may be capable of providing a nominal voltage of 48 V with a current up to 550 A. The battery module 10 may be enclosed in a housing 12 and broadly comprises first and second collections of battery cells 14, 16 which may be monitored and controlled by a battery management system 18 and an array of semiconductor switches 20 (depicted in FIG. 2), a negative terminal 22, and a positive terminal switch assembly 24.

The housing 12 may comprise an open top container 26 and lid 28 sealed together to prevent dust, water, or other contaminants from entering the housing 12. In some embodiments, the housing 12 may be hermetically sealed. The container 26 may comprise a pair of handles 30, 32 for carrying the battery module 10 and a pressure relief vent 34 for controlling heat and gas expansion in the case of failure. The lid 28 may comprise a plurality of sealable access openings 36, 38, 40 for allowing access to the battery management system 18, the negative terminal 22, or the switch assembly 24.

Figure 2:
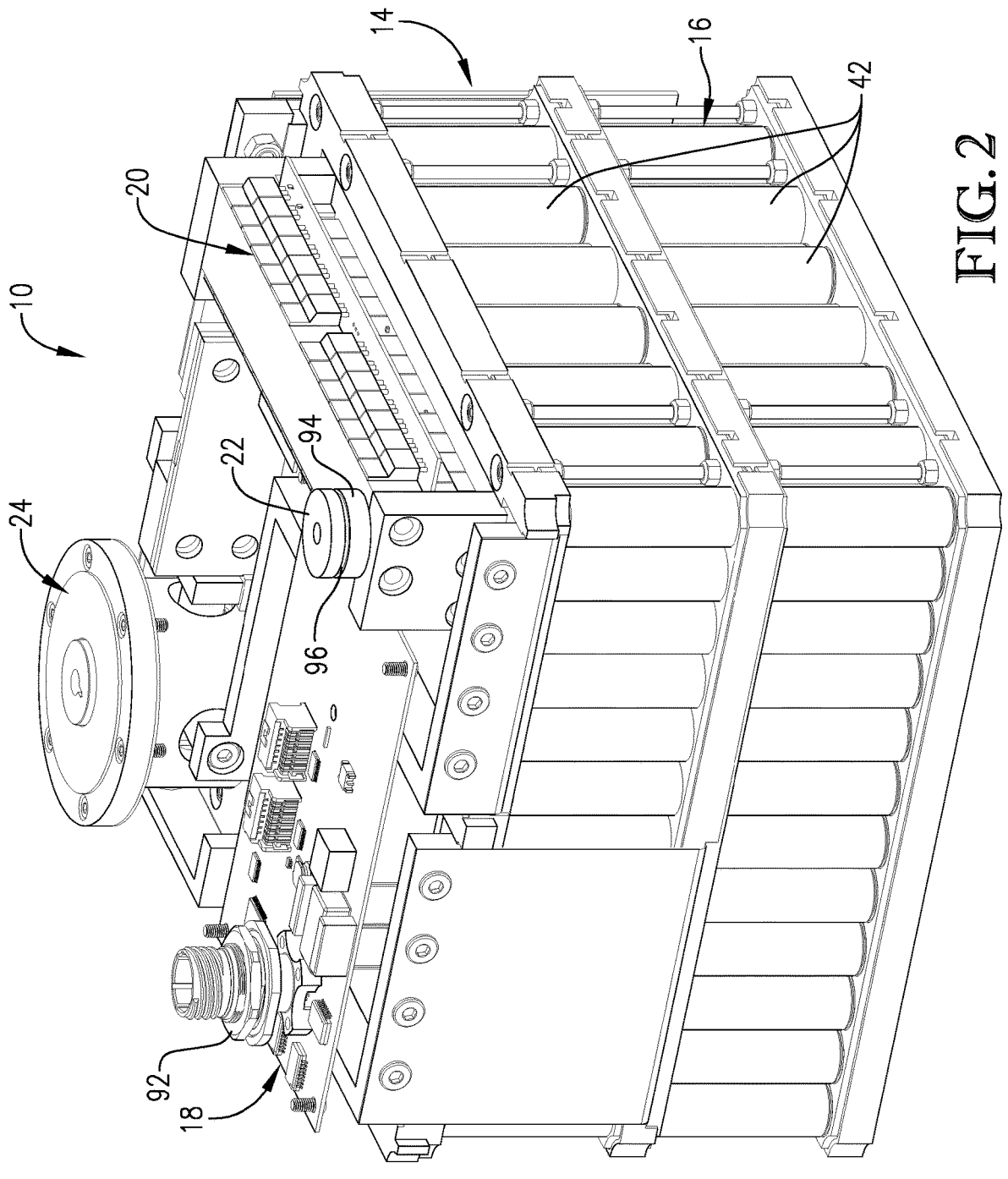
FIG. 2 is a perspective view of the battery module of FIG. 1 with its housing removed.
Figure 8:
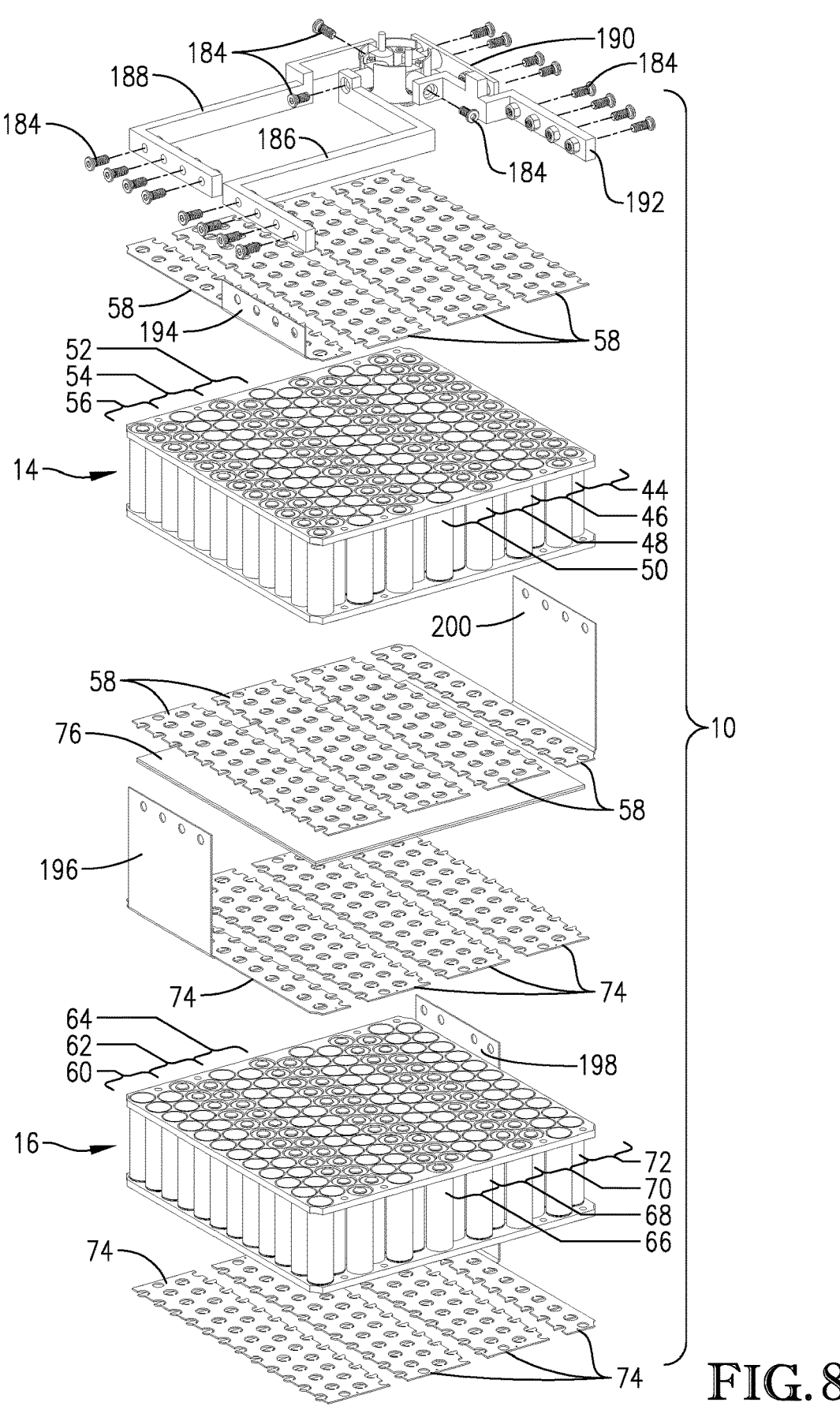
FIG. 8 is a raised front exploded view of selected components of the battery module of FIG. 1 that together form a circuit.
Figure 9:
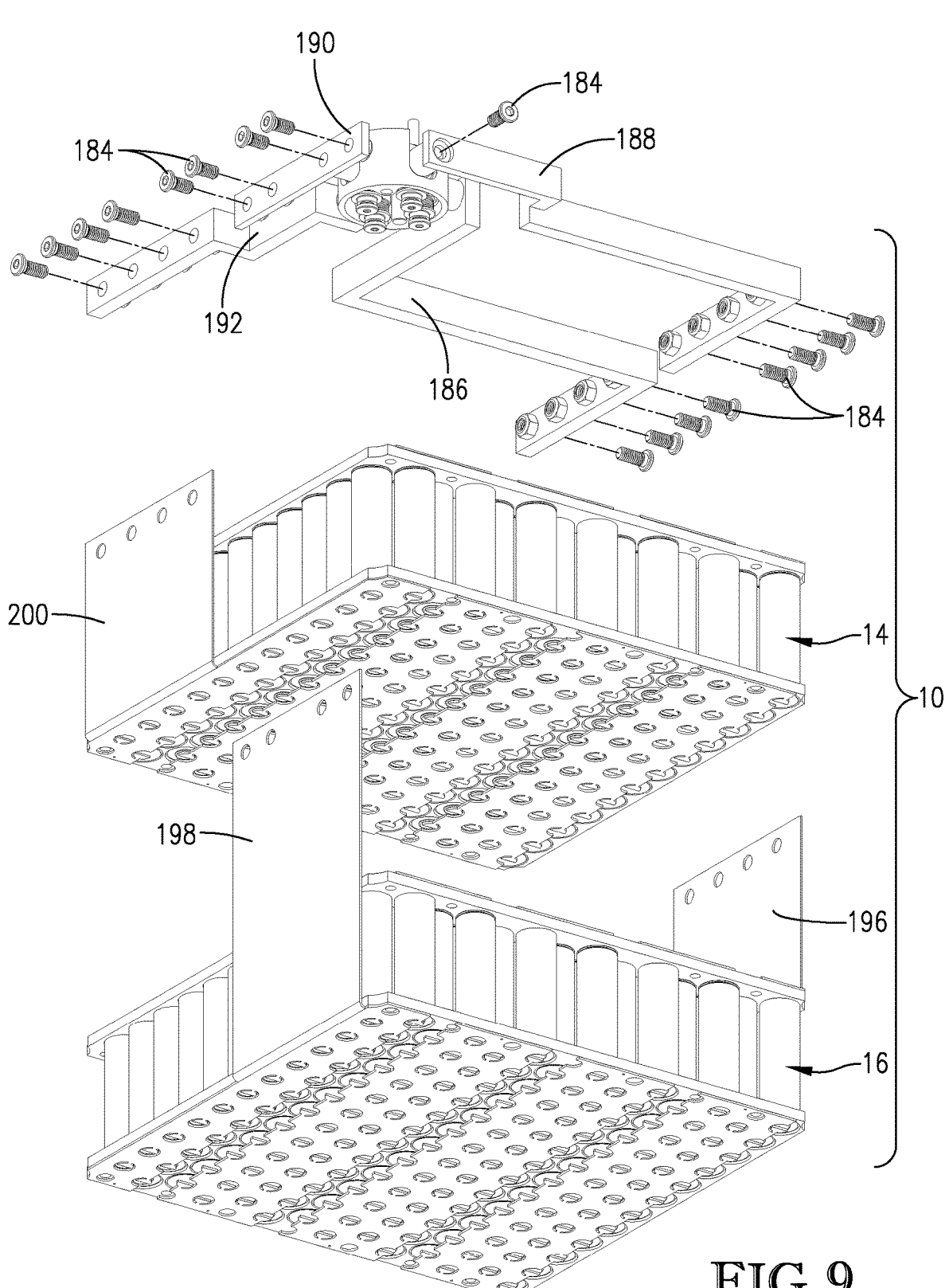
FIG. 9 is a lowered rear exploded view of the selected components of FIG. 8.

Turning to FIG. 2, each of the first and second collections of battery cells 14, 16 may comprise a plurality of individual battery cells 42. The battery cells 42 may be lithium-ion battery cells, such as nickel-manganese-cobalt (NMC) battery cells having nominal discharge voltages of 3.6 V at a current of 1.5 A. Battery cells 42 in the same rows may be connected to one another in parallel and connected to other rows in series to achieve a voltage of about 25.2 V, or a nominal voltage of 24 V. For example, as depicted in FIG. 8, the battery cells 42 in the pair of rows 44 are connected to one another in parallel, and the pair of rows 44 are connected to the battery cells 42 of the pair of rows 46 in series. Thus, the pairs of rows 44, 46, 48, 50, 52, 54, 56 of the first collection of battery cells 14 are connected in series via collector plates 58. Likewise, pairs of rows 60, 62, 64, 66, 68, 70, 72 of the battery cells 42 of the second collection 16 may be connected in series via collector plates 74. The collections of battery cells 14, 16 may be electrically isolated from one another via insulative material 76. Each collection 14, 16 may be configured as such to achieve a maximum, or cranking amperage, of up to 550 A and a nominal discharge current of up to 90 A. The collections of battery cells 14, 16 are configured to connect to the negative terminal 22 and switch assembly 24, as discussed in further detail below.

Figure 3:
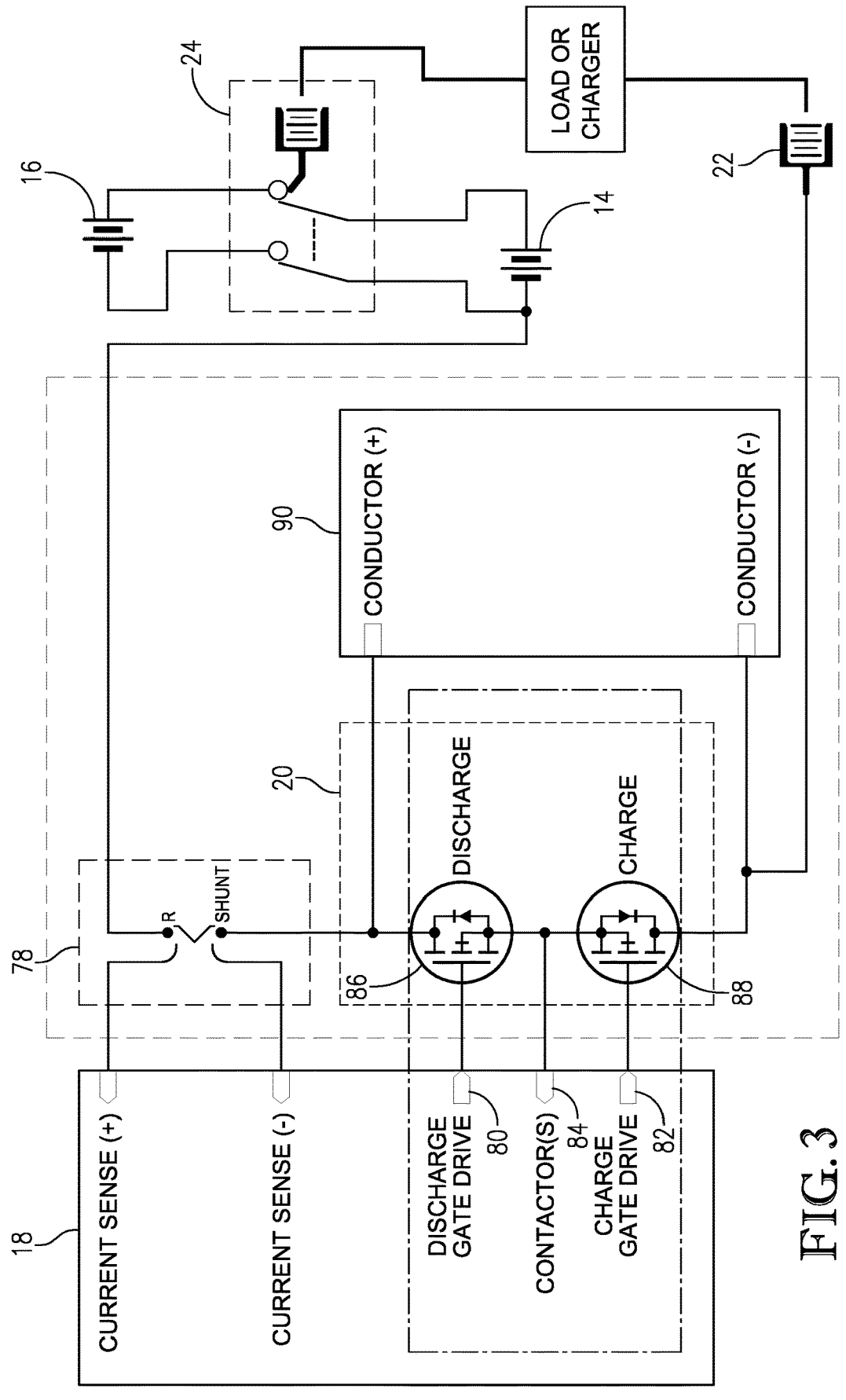
FIG. 3 is a schematic diagram depicting selected components of the battery module of FIG. 1.

Turning to FIG. 3, the battery management system 18 is configured to control the charging and discharging of the collections of battery cells 14, 16 via the array of semiconductor switches 20. The semiconductor switches 20 may be low-side switches connected to the negative-most terminal of the first collection of battery cells 14 (or the negative junction) and the negative terminal 22. The battery management system 18 is configured to direct the semiconductor switches 20 to open or close to allow current to flow between the negative terminal 22 and the collections of battery cells 14, 16 to a common source. The battery management system 18 may comprise a sensor 78 for detecting current flowing between the switches 20 and the negative-most terminal of the first collection of battery cells 14. The sensor 78 may be electrically isolated from the conductive material through which the detected current travels. The battery management system 18 may be configured to determine the magnitude and direction of the current. The battery management system 18 may also comprise a discharge gate drive 80, a charge gate drive 82, and a contactor source connection 84 for providing a reference for the semiconductor switches 20.

The semiconductor switches 20 may comprise a discharge switch 86 and a charge switch 88. The discharge switch 86 may be connected to the negative most terminal of the first collection of battery cells 14 and the contactor source 84 and may be driven by the discharge gate drive 80. The battery management system 18 may be configured to detect a discharge current via the sensor 78 and direct, via the discharge gate drive 80, the discharge switch 86 to activate or close to enable current to flow from the collection of battery cells 14 to the contactor source 84. The charge switch 88 is connected to the negative terminal 22 and the contactor source 84 and may be driven by the charge gate drive 82. The battery management system 18 may be configured to detect a charging current via the sensor 78 and direct, via the charge gate drive 82, the charge switch 88 to activate or close to enable current to flow from the negative terminal 22 to the contactor source 84.

In some embodiments, the discharge switch 86 may be a MOSFET with its gate driven by the discharge gate drive 80, the drain being connected to the collection of battery cells 14, and the source connected to the contactor source 84. The charge switch 88 may also be a MOSFET with its gate driven by the charge gate drive 82, the drain being connected to the negative terminal 22, and the source connected to the contactor source 84. By connecting the semiconductor switches 20 to the common source 84, the charge switch 88 will not unintentionally be kept on or activated due to over-discharged battery cells 42, thereby preventing over-charging of the battery cells 42 and fire damage. In some embodiments, a transient voltage suppressor 90 may be connected in parallel to the switches 20. The transient voltage suppressor 90 may comprise a Zener diode.

Turning back to FIGS. 1 and 2, the battery management system 18 may further comprise communication port 92 extending through sealable access opening 36, and the negative terminal 22 may comprise a cylindrical post 94 extending through sealable access opening 38. The communication port 92 may be threaded to permit attachment of a communication cable (not shown). The battery management system 18 may be configured to transmit certain signals about the battery cells 42 through the communication port 92. The post 94 of the negative terminal 22 may include an annular slot 96 for receiving a gasket (not shown) that enables a sealed connection to an external cable (schematically depicted in FIG. 3).

Figure 4:
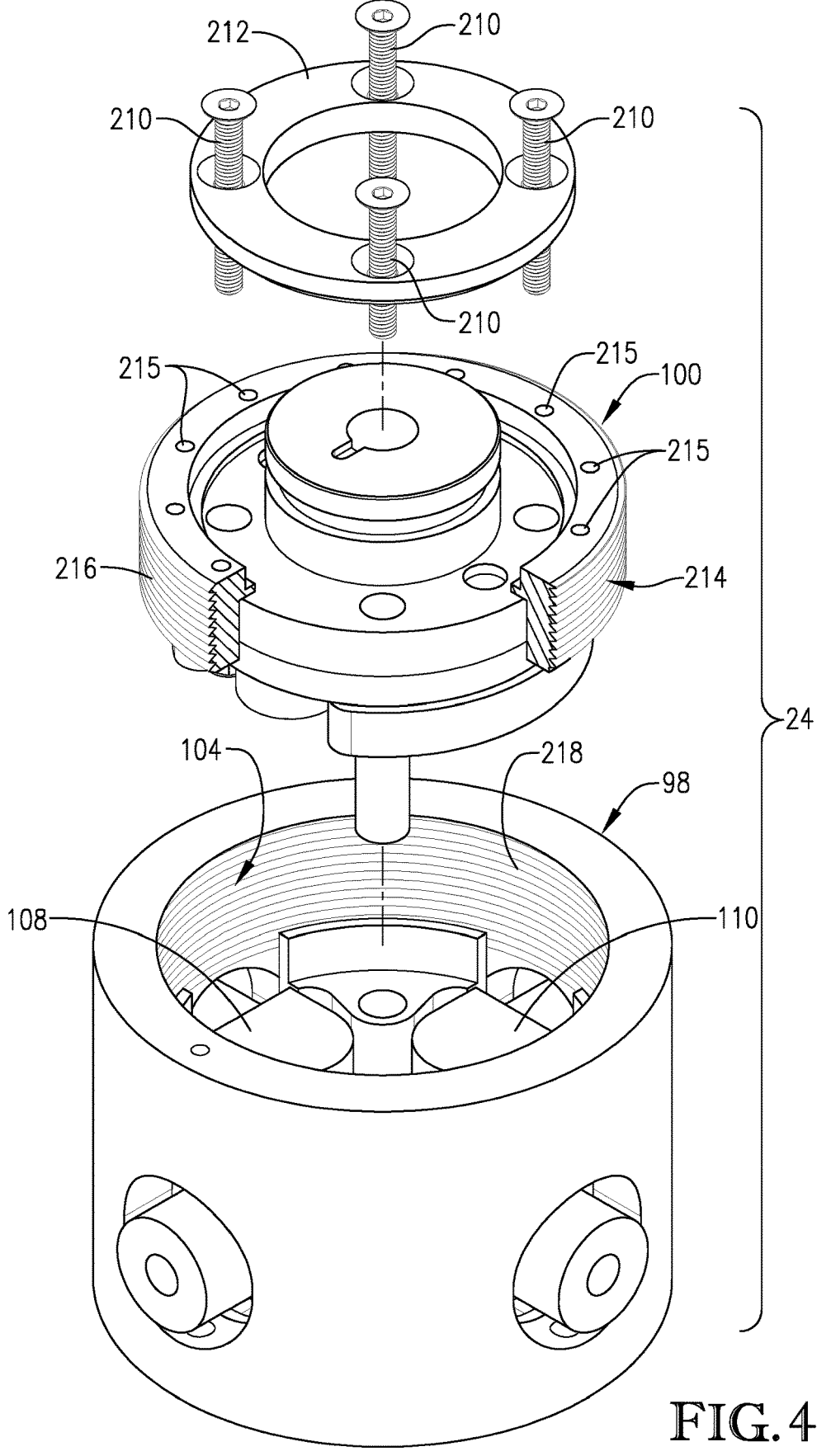
FIG. 4 is a perspective view of a switch assembly of the battery module of FIG. 1.
Figure 5:
FIG. 5 is an exploded view of a base unit of the switch assembly of FIG. 4.
Figure 6:
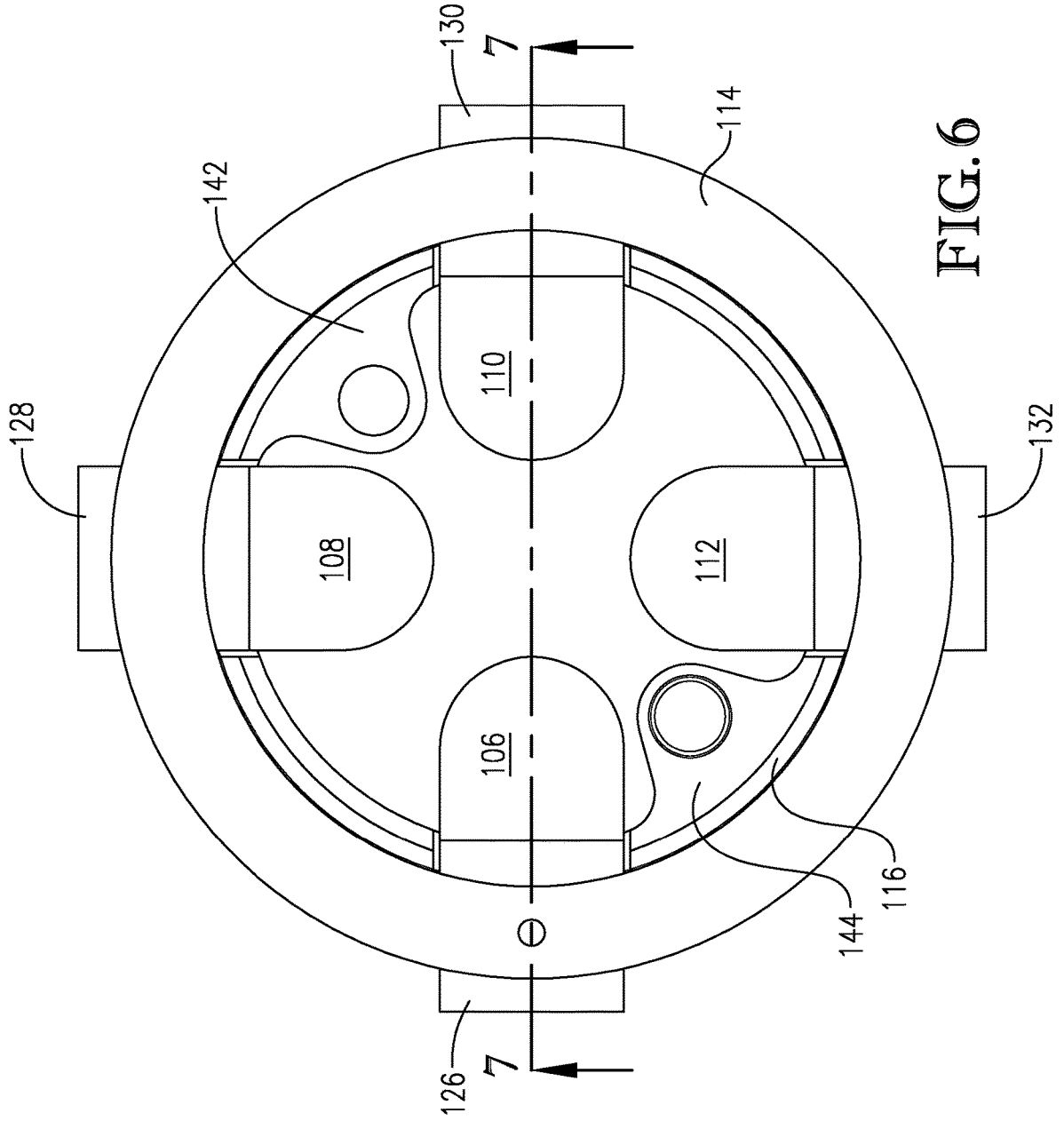
FIG. 6 is a top plan view of the base unit of FIG. 5.
Figure 7:
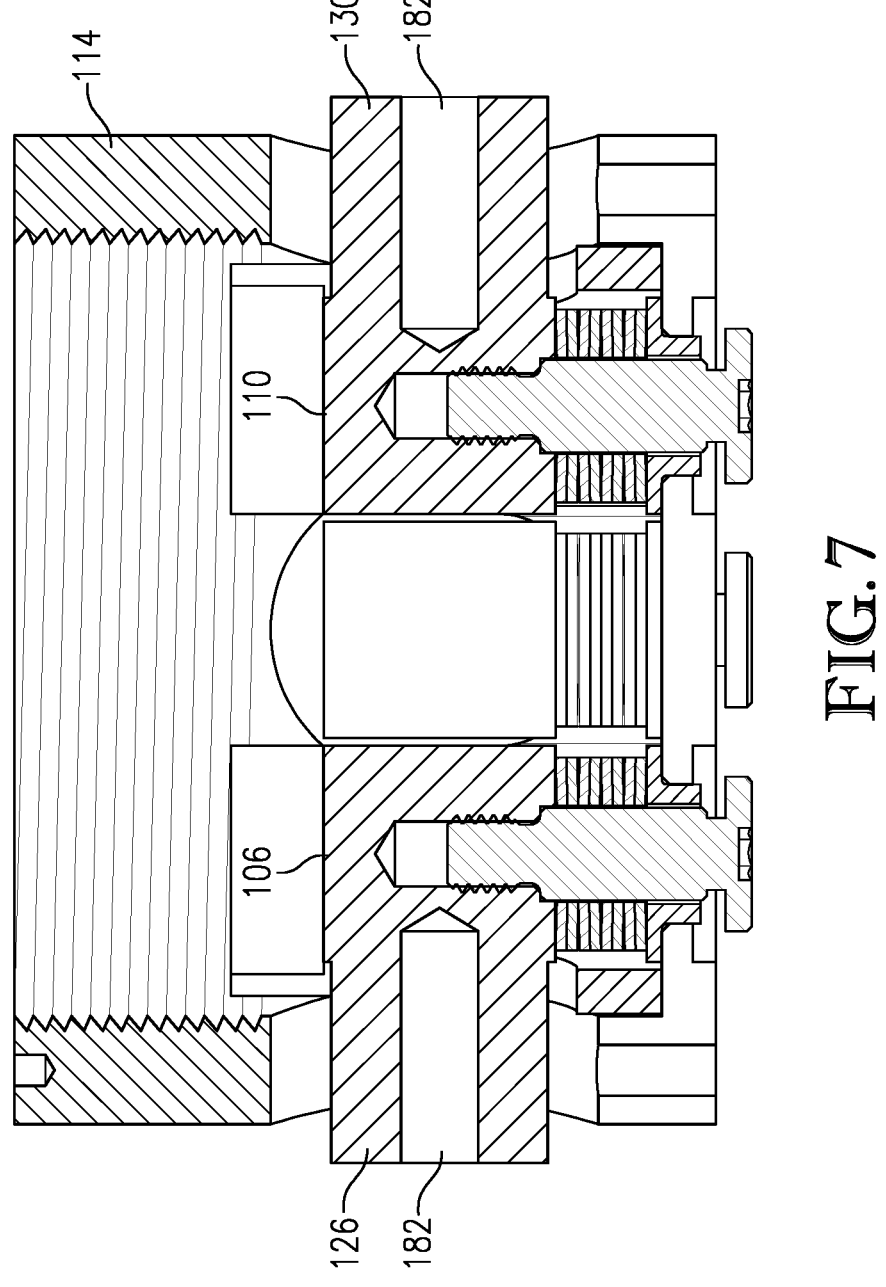
FIG. 7 is a side sectional view of the base unit of FIG. 5.
Figure 13:
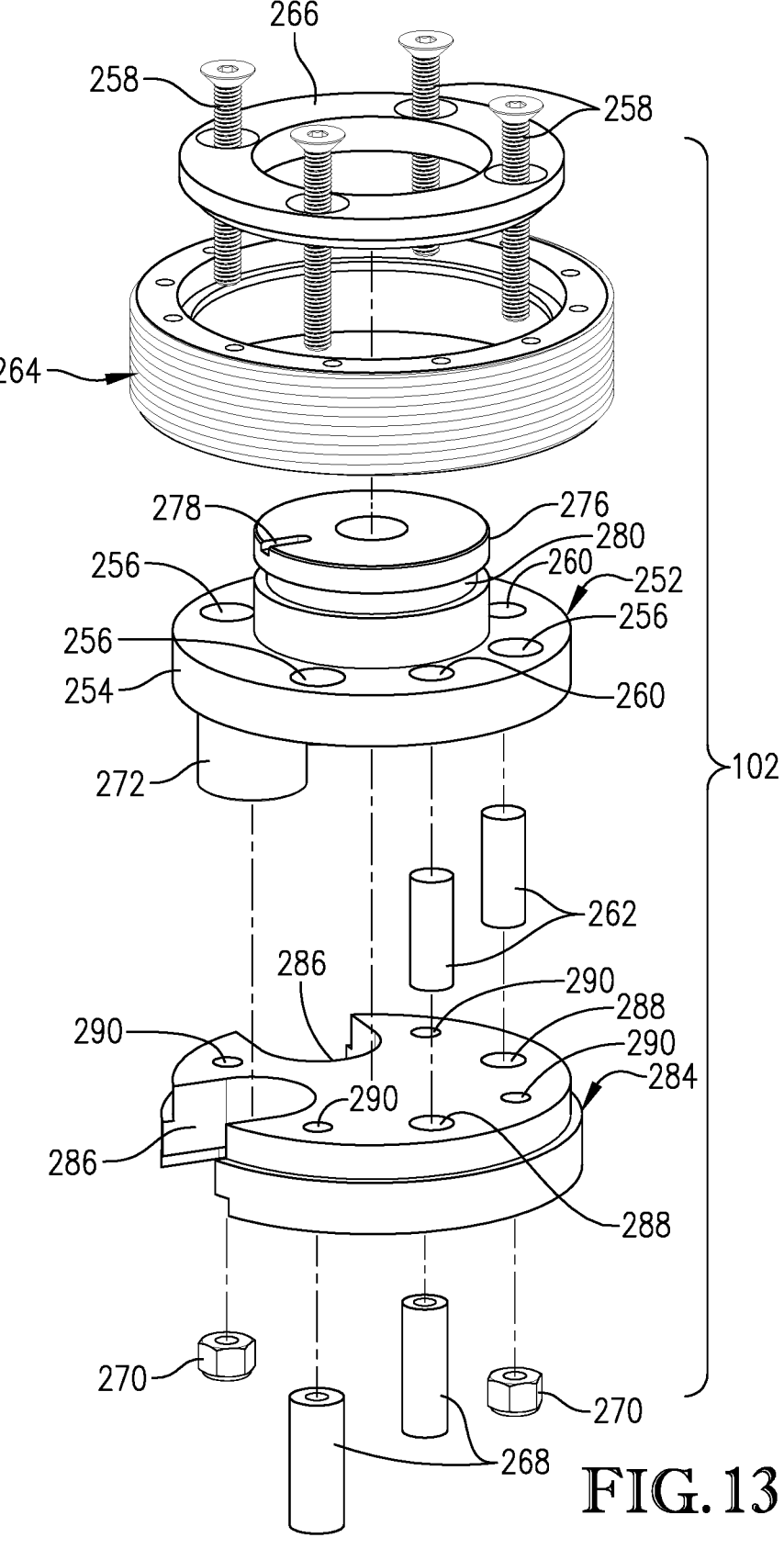
FIG. 13 is an exploded view of a second plug of the switch assembly of FIG. 4.
Figure 14:
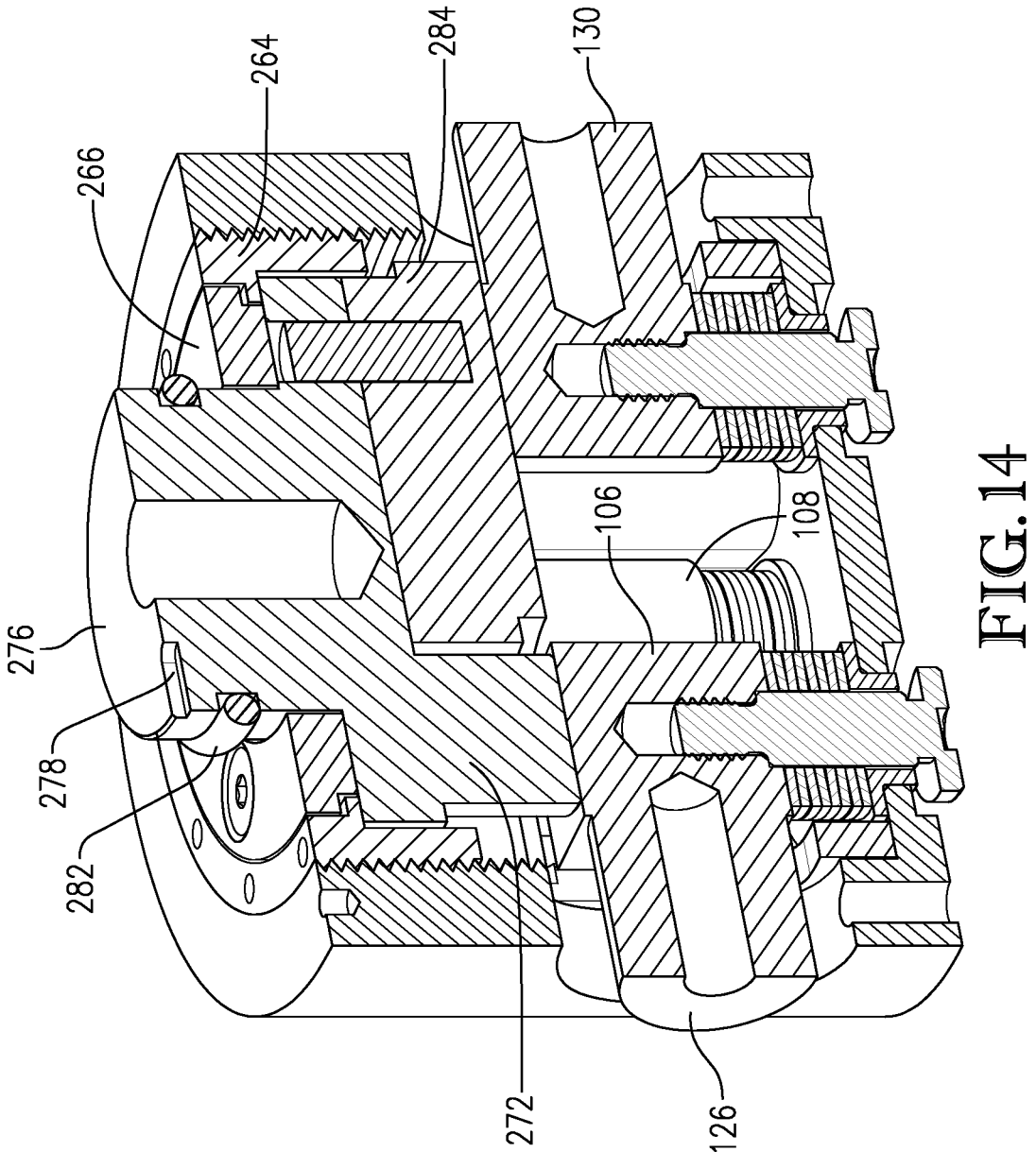
FIG. 14 is a raised sectional view of the second plug of FIG. 13.
Figures 15, 16:
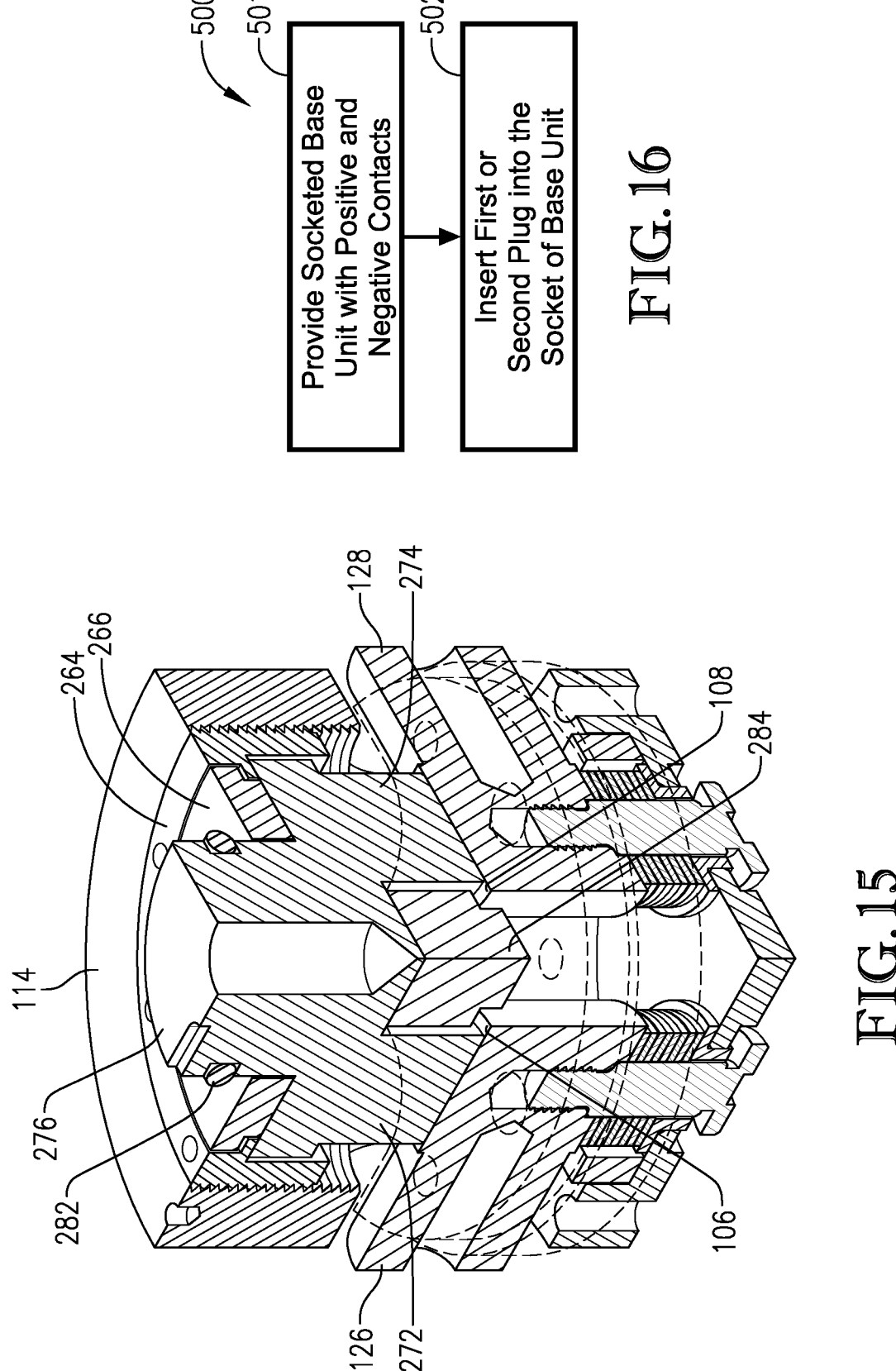
FIG. 15 is a raised sectional view of the second plug of FIG. 13 showing a first connector of the second plug.
FIG. 16 is a flowchart illustrating a method of configuring a battery module to operate in one of two modes according to an embodiment of the present invention.

Turning to FIG. 4, the switch assembly 24 comprises a base unit 98, a first plug 100, and an interchangeable second plug 102 (depicted in FIGS. 13-15). The base unit 98 defines a socket 104 for receiving one of the plugs 100, 102 and comprises a plurality of contacts 106, 108, 110, 112. As depicted in FIG. 5, the base unit 98 may include an outer wall 114 and an inner wall 116 operable to be positioned inside the outer wall 114. The outer wall 114 and the inner wall 116 may comprise or be made of insulative material. The outer wall 114 may include one or more access holes 118, 120, 122, 124 through which leads 126, 128, 130, 132 extend from their respective contacts 106, 108, 110, 112. The inner wall 116 may include a plurality of slots 134, 136, 138, 140 corresponding and aligned with the access holes 118, 120, 122, 124 of the outer wall 114. The inner wall 116 may further include protrusions 142, 144 extending radially inwardly that define slots 146, 148 for receiving portions of the plugs 100, 102, as discussed in further detail below. One of the slots 148 of the inner wall 116 may further be configured to receive an alignment key 149 extending from the outer wall 114.

The contacts 106, 108, 110, 112 may be secured to the outer wall 114 via a plurality of fasteners 150, 152, 154, 156. The fasteners 150, 152, 154, 156 may extend through holes 158, 160, 162, 164 in the bottom of the outer wall 114. The fasteners 150, 152, 154, 156 may be operable to slide in and out of the holes 158, 160, 162, 164. A plurality of grommets 166, 168, 170, 172 may be positioned in the holes 158, 160, 162, 164 to guide the fasteners 150, 152, 154, 156 as they slide. A plurality of biasing members 174, 176, 178, 180 may bias the contacts 106, 108, 110, 112, and by extension the fasteners 150, 152, 154, 156, in an upwards position. The biasing members 174, 176, 178, 180 maintain the contacts 106, 108, 110, 112 in tight contact with connectors of the plugs 100, 102, as discussed in further detail below. The contacts 106, 108, 110, 112 may be spaced about a center of the socket 104 at 90-degree increments.

As depicted in FIGS. 6-9, the leads 126, 128, 130, 132 may extend out of the outer wall 114 and include fastener holes 182 for receiving fasteners 184 that secure bus bars 186, 188, 190, 192 to the leads 126, 128, 130, 132. The bus bars 186, 188, 190, 192 may provide electrical connections to connector plates 194, 196, 198, 200, which are connected to the collector plates 58, 74 of the battery cell collections 14, 16. In particular reference to FIGS. 8 and 9, lead 126 is connected to bus bar 186, which connects to connector plate 194 connected to the positive most collector plate 58 of the first collection of battery cells 14. Lead 128 is connected to bus bar 188, which connects to connector plate 196 connected to the negative most collector plate 74 of the second collection of battery cells 16. Lead 130 is connected to bus bar 190, which connects to connector plate 198 connected to the positive most collector plate 74 of the second collection of battery cells 16. Lead 132 is connected to bus bar 192, which connects to connector plate 200 connected to the negative most collector plate 58 of the first collection of battery cells 14. In other words, contact 106 is connected to the positive terminal of the first collection of battery cells 14, and contact 112 is connected to the negative terminal of the first collection of battery cells 14. Further, contact 110 is connected to the positive terminal of the second collection of battery cells 16, and contact 108 is connected to the negative terminal of the second collection of battery cells 16.

Figure 10:
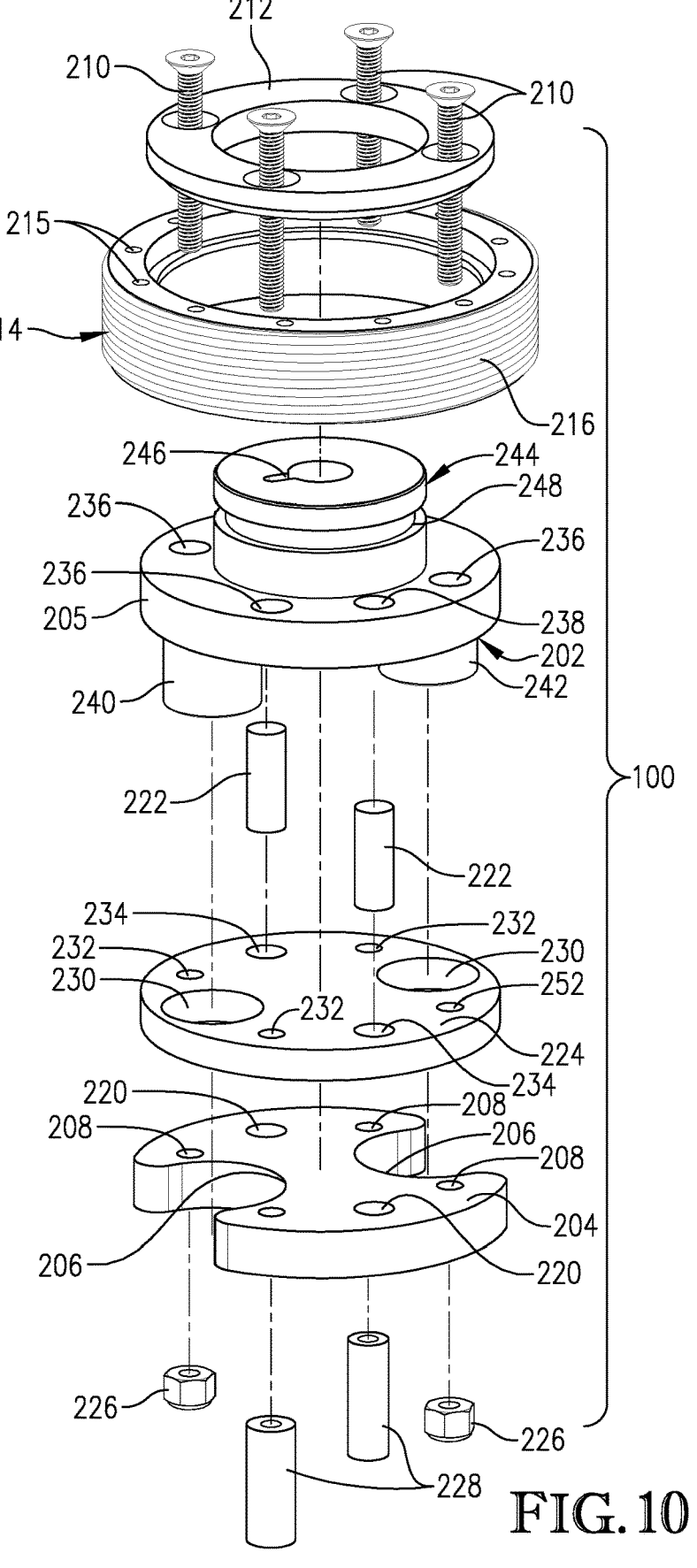
FIG. 10 is an exploded view of a first plug of the switch assembly of FIG. 4.

Turning to FIG. 10, the first plug 100 is configured to be inserted into the socket 104 and comprises a first connector 202 operable to connect positive contacts 106, 110 and a second connector 204 operable to connect negative contacts 108, 112 when the plug 100 is inserted into the socket 104. This results in the first collection of battery cells 14 being connected in parallel with the second collection of battery cells 16.

Figure 11:
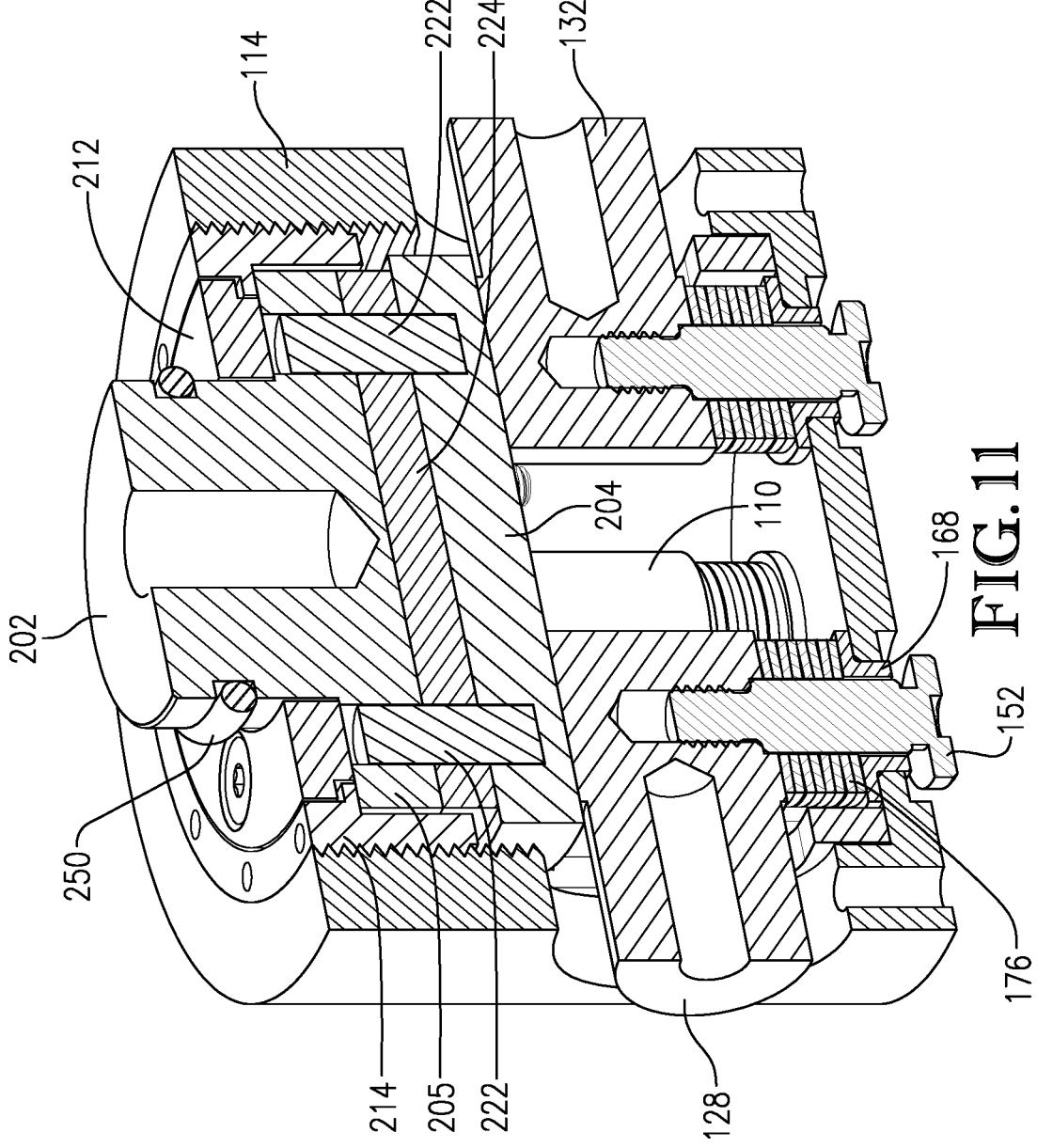
FIG. 11 is a lowered sectional view of the first plug of FIG. 10.

The second connector 204 may comprise a conductive plate that extends from contact 108 to contact 112 (as depicted in FIG. 11) and includes a pair of recesses 206 formed in the conductive plate. The recesses 206 may be slots, holes, passages, or the like without departing from the scope of the present invention. The second connector 204 may also include fastener holes 208 for receiving fasteners 210 which clamp down on a plate 212 to rotatably secure a collar 214 to the first plug 100. The collar 214 may comprise a threaded outer surface 216 operable to mate with a threaded inner surface 218 of the outer wall 114 of the base unit 98 to secure either of the plugs 100, 102 to the base unit 98. The collar 214 may include tool holes 215 annularly spaced about the top surface of the collar 214 for receiving matching tines from a tool (not shown) for gripping the collar 214 to rotate it and fasten or unfasten the collar 214 to or from the wall 114.

The fasteners 210 may comprise insulative material for maintaining electrical isolation between the connectors 202, 204. For example, the fasteners 210 may be made of nylon or include nylon sleeves. The fasteners 210 may engage nuts 226 and/or guide members 228. The guide members 228 are operable to be inserted into the slots 146, 148 of the inner wall 116 of the base unit 98 to guide the connectors 202, 204 to their respective contacts 106, 108, 110, 112 as the plug 100 is secured to the base unit 98. The nuts 226 may also be made of conductive material, such as nylon or the like.

The second connector 204 may also include alignment member holes 220 for receiving alignment members 222 which align the second connector 204 with the first connector 202 and an insulative layer 224 that electrically isolates the second connector 204 and the first connector 202. The insulative layer 224 may also include corresponding recesses 230, fastener holes 232, and alignment member holes 234 that align with the recesses 206, fastener holes 208, and alignment member holes 220 of the second connector 204.

Figure 12:
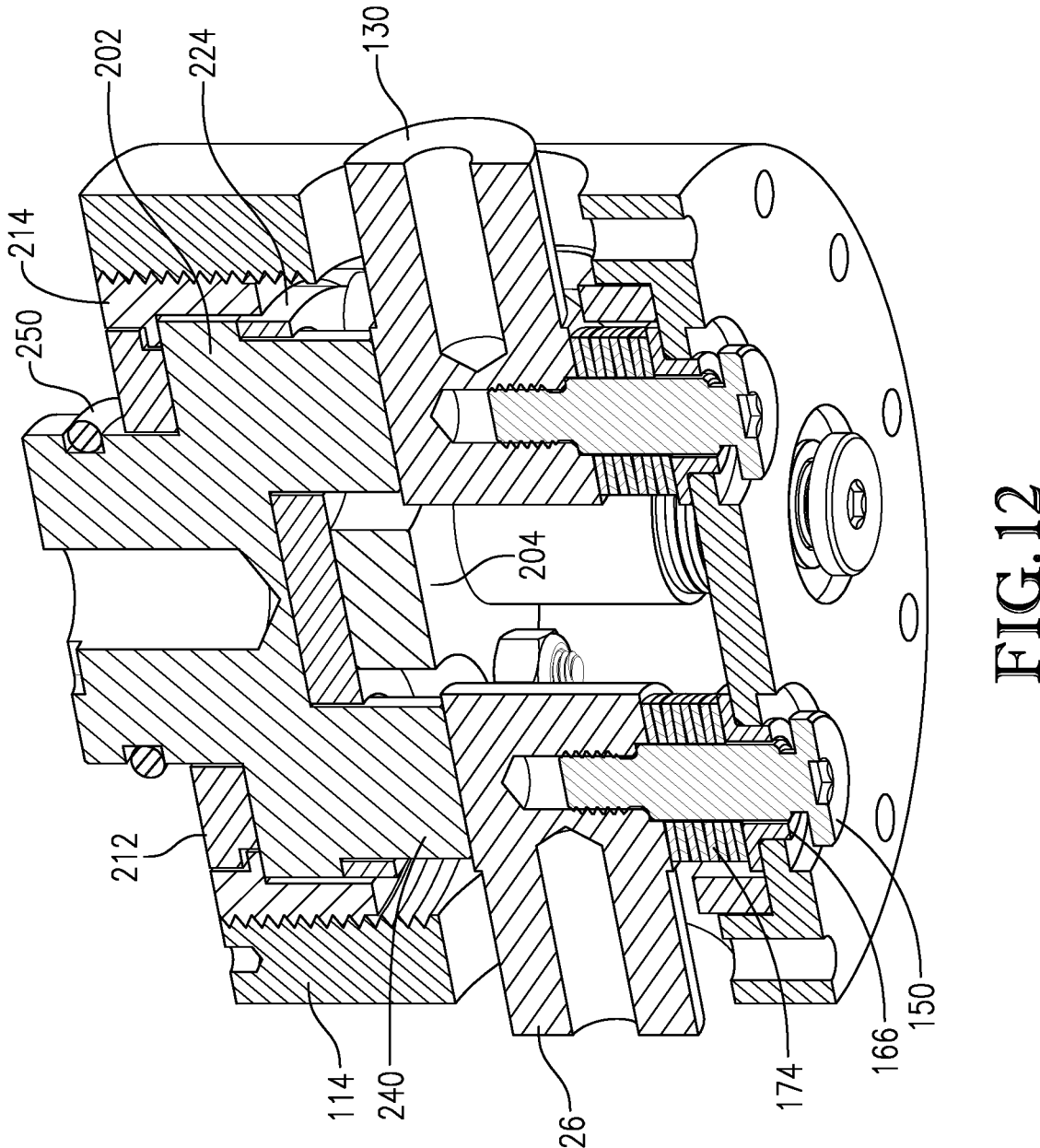
FIG. 12 is a raised sectional view of the first plug of FIG. 10.

The first connector 202 may comprise a conductive plate 205 that also has corresponding fastener holes 236 and alignment member holes 238 that align with the fastener holes 232 and alignment member holes 234 of the insulative layer 224. The first connector 202 may further comprise a pair of bottom protrusions 240, 242 that extend through the recesses 206, 230 of the second connector 204 and the insulative layer 224, respectively, and abut contacts 106, 110 (as depicted in FIG. 12) when the first plug 100 is inserted into the socket 104. The first connector 202 may further comprise a terminal 244 extending upwardly from the conductive plate 205 which serves as the positive terminal for the battery module 10. The terminal 244 may include an indication 246 uniquely associated with the first plug 100. The terminal 244 may also include an annular slot 248 for receiving a gasket 250 (depicted in FIGS. 11 and 12), which enables an external cable to be hermetically sealed to the terminal 244.

Turning to FIG. 13, the second plug 102 comprises a connector 252 operable to connect only the first positive contact 106 and the second negative contact 108 so that the collections of battery cells 14, 16 are in a series configuration. The connector 252 of the second plug 102 may include a conductive plate 254 having formed therein fastener holes 256 for receiving fasteners 258 and alignment member holes 260 for receiving alignment members 262. Similar to fasteners 210, fasteners 258 are configured to secure the second plug 102 together and to secure a rotatable collar 264 to the second plug 102 via a plate 266. The fasteners 258 may engage guide members 268 for inserting into slots 146, 148 of the base unit 98 and/or nuts 270. The connector 252 may further include a pair of bottom protrusions 272, 274 that extend downwardly to abut and thereby connect contact 106 with contact 108 (as depicted in FIGS. 14 and 15). The connector 252 may further comprise a terminal 276 extending upwardly from the conductive plate 254 which serves as the positive terminal for the battery module 10. The terminal 276 may include an indication 278 uniquely associated with the second plug 102. The terminal 276 may also include an annular slot 280 for receiving a gasket 282 (depicted in FIGS. 14 and 15).

The second plug 102 may also include an insulative layer 284 having a pair of recesses 286 for receiving the protrusions 272, 274 of the connector 252, alignment member holes 288 for receiving the alignment members 262, and fastener holes 290 for receiving the fasteners 258. The insulative layer 284 may abut contacts 110, 112 so that the second plug 102 is seated securely in the socket 104.

While the embodiment depicted in the FIGS. show the switch assembly 24 serving as the positive terminal for the battery module 10, the switch assembly 24 may be used as a negative terminal or just a connection without departing from the scope of the present invention. For example, some embodiments may have reverse configurations so that the switch assembly 24 serves as the negative terminal, and the terminal 22 serves as the positive terminal for the module 10. The connectors of the plugs 100, 102 could be configured to connect different contacts of the base unit 98 without departing from the scope of the present invention.

The flow chart of FIG. 16 depicts the steps of an exemplary method 500 of configuring a battery module, such as embodiments of battery module 10, to operate in one of two modes. In some alternative implementations, the functions noted in the various blocks may occur out of the order depicted in FIG. 16. For example, two blocks shown in succession in FIG. 16 may in fact be executed substantially concurrently, or the blocks may sometimes be executed in the reverse order depending upon the functionality involved. In addition, some steps may be optional.

The first mode may comprise a configuration in which the battery module operates at a first voltage, and the second mode may comprise a configuration in which the battery module operates at a second voltage. In some embodiments, the second voltage may be higher than the first voltage. Further, the nominal current rating of the first mode may be higher than the nominal current rating of the second mode. In some embodiments, the nominal voltage of the battery module 10 may be 24 V in the first mode and 48 V in the second mode. The crank current may be up to 1100 A and the nominal current around 180 A in the first mode. The crank current may be up to 550 A and the nominal current around 90 A in the second mode. However, the particular electrical characteristics of each mode may vary widely without departing from the scope of the present invention. For example, instead of the second mode having a voltage twice that of the voltage of the first mode, the second mode voltage may only be 1.5 times higher than the first mode voltage. Alternatively, the second mode voltage may only be triple that of the first mode voltage.

Referring to step 501, a base unit may be provided. The base unit may define a socket in which are located first and second positive contacts and first and second negative contacts. The base unit may include an outer wall and an inner wall operable to be positioned inside the outer wall. The outer wall and the inner wall may be made of insulative material. The outer wall may include one or more access holes through which leads extend from their respective contacts. The inner wall may include a plurality of slots corresponding to and aligned with the access holes of the outer wall. The inner wall may further include protrusions extending radially inwardly that define slots for receiving portions of plugs, as discussed in further detail below. One of the slots of the inner wall may further be configured to receive a key protrusion extending from the outer wall.

The contacts may be secured to the outer wall via a plurality of fasteners that extend through holes in the bottom of the outer wall and that are slidable therein. A plurality of grommets may be positioned in the holes at the bottom of the outer wall and guide the fasteners as they slide in their respective holes. A plurality of biasing members may bias the contacts and by extension the fasteners in an upwards position. The contacts may be spaced about a center of the socket at 90-degree increments.

The leads connected to the contacts may extend out of the outer wall and include fastener holes for receiving fasteners that secure bus bars to the leads. The bus bars may provide electrical connections to connector plates, which may be connected to collector plates of collections of battery cells of the battery module. In some embodiments, one of the contacts is connected to the positive terminal of a first collection of the battery cells of the battery module, and another contact is connected to the negative terminal of the first collection of battery cells. Further, one of the contacts is connected to the positive terminal of a second collection of the battery cells of the battery module, and one of the contacts is connected to the negative terminal of the second collection of battery cells.

Referring to step 502, either a first or second plug is inserted into the socket. The first plug may comprise a first connector operable to connect the first positive contact to the second positive contact and a second connector operable to connect the first negative contact to the second negative contact when the first plug is inserted into the socket. The second plug may comprise a connector operable to connect only the first positive contact to the second negative contact when the second plug is inserted into the socket.

The second connector of the first plug may comprise a conductive plate that extends from between the negative contacts and may include a pair of recesses. The second connector may also include fastener holes for receiving fasteners which clamp down on a plate to rotatably secure a collar to the first plug. The collar may comprise a threaded outer surface operable to mate with a threaded inner surface of the outer wall of the base unit to secure either of the plugs to the base unit. The collar may include tool holes annularly spaced about the top surface of the collar for receiving protrusions from a tool for fastening or unfastening the collar to the outer wall.

The fasteners may comprise insulative material for maintaining electrical isolation between the connectors. For example, the fasteners may be made of nylon or include nylon sleeves. The fasteners may engage nuts and/or guide members. The guide members are operable to be inserted into the slots of the inner wall of the base unit to guide the connectors to their respective contacts as the first plug is secured to the base unit.

The second connector of the first plug may also include alignment member holes for receiving alignment members that align the second connector with the first connector and with an insulative layer. The insulative layer may electrically isolate the second connector and the first connector and include corresponding recesses, fastener holes, and alignment member holes that align with the recesses, fastener holes, and alignment member holes of the second connector.

The first connector may comprise a conductive plate that also has corresponding fastener holes and alignment member holes that align with the fastener holes and alignment member holes of the insulative layer. The first connector may further comprise a pair of bottom protrusions that extend through the recesses of the second connector and the insulative layer and abut the positive contact. The first connector may further comprise a terminal extending upwardly from the conductive plate which serves as the positive terminal for the battery module. The terminal may include an indication uniquely associated with the first plug. The terminal may also include an annular slot for receiving a gasket.

The second plug may comprise a conductive plate having formed therein fastener holes for receiving fasteners and alignment member holes for receiving alignment members. Similar to the fasteners of the first plug, the fasteners of the second plug are configured to secure the second plug together and to secure a rotatable collar to the second plug via a plate. The fasteners may engage guide members for inserting into slots of the base unit and/or nuts. The connector may further include a pair of bottom protrusions that extend downwardly to abut and thereby connect the positive contact of the first collection of battery cells with the negative contact of the second collection of battery cells to put the collections of battery cells in series. The connector may further comprise a terminal extending upwardly from the conductive plate which serves as the positive terminal for the battery module. The terminal may include an indication uniquely associated with the second plug. The terminal may also include an annular slot for receiving a gasket.

The second plug may further include an insulative layer having a pair of recesses for receiving the protrusions of the connector, alignment member holes for receiving the alignment members, and fastener holes for receiving the fasteners of the second plug.

The method 500 may include additional, less, or alternate steps and/or device(s), including those discussed elsewhere herein. For example, the method 500 may include fastening a collar to the base unit. The method 500 may also include unfastening the collar to remove one of the plugs and replace the one of the plugs with the other plug.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the invention has been described with reference to the embodiments illustrated in the attached drawing figures, it is noted that equivalents may be employed and substitutions made herein without departing from the scope of the invention as recited in the claims of any subsequent regular utility application.

We claim:

1. A switch assembly for a battery module, the switch assembly comprising:

a base unit defining a socket in which are located first and second positive contacts and first and second negative contacts;

a first plug configured to be inserted into the socket and comprising a first connector operable to connect the first positive contact to the second positive contact and a second connector operable to connect the first negative contact to the second negative contact when the first plug is inserted into the socket; and a second plug comprising a connector operable to connect only the first positive contact to the second negative contact when the second plug is inserted into the socket.

2. The switch assembly of claim 1, wherein the base unit comprises a plurality of leads that extend through the base unit and are configured to connect each of the positive and negative contacts with respective positive and negative busbars of the battery module.

3. The switch assembly of claim 2, wherein the plurality of leads are spaced about a center of the socket at ninety-degree increments.

4. The switch assembly of claim 1, wherein the base unit further comprises a plurality of biasing members configured to upwardly bias the first positive contact, the second positive contact, the first negative contact, and the second negative contact.

5. The switch assembly of claim 1, wherein one of the first and second connectors of the first plug comprises a bottom conductive plate having top and bottom surfaces and a pair of recesses formed therein extending between the top and bottom surfaces, and wherein the first plug comprises an insulative layer in contact with the top surface of the bottom conductive plate and includes a pair of slots that are aligned with the recesses of the bottom conductive plate.

6. The switch assembly of claim 5, wherein the other of the first and second connectors of the first plug comprises:

a top conductive plate having top and bottom surfaces, wherein the bottom surface of the top conductive plate is in contact with the insulative layer;

a pair of bottom projections extending downwardly from the bottom surface of the top conductive plate and through the pair of slots of the insulative layer and the pair of recesses of the bottom conductive plate; and a terminal extending from the top surface of the top conductive plate.

7. The switch assembly of claim 6, wherein the terminal of the first plug includes an indication uniquely associated with the first plug.

8. The switch assembly of claim 6, further comprising a collar securing the top conductive plate within the socket.

9. The switch assembly of claim 1, wherein:

the second plug comprises an insulative layer with a pair of recesses that align with the first positive contact and the second negative contact when the second plug is inserted into the socket, and the connector of the second plug comprises:

a conductive plate including a bottom surface adjacent to the insulative layer, and a top surface opposite the bottom surface, bottom protrusions extending downwardly from the bottom surface and through the pair of recesses of the insulative layer, and a top protrusion extending from the top surface.

10. The switch assembly of claim 9, wherein the top protrusion of the second plug includes an indication uniquely associated with the second plug.

11. A method of configuring a battery module to operate in one of two modes, the method comprising:

providing the switch assembly of claim 1; and inserting into the socket either the first or second plug.

12. The method of claim 11, wherein the battery module comprises a collar fastenable to the base unit, further comprising fastening the collar to the base unit to secure either the first or second plug to the base unit.

13. The method of claim 11, further comprising removing the inserted first or second plug and installing the other of the first or second plug, wherein the first plug enables a first voltage output for the battery module and the second plug enables a second voltage output for the battery module that is twice the first voltage output.

14. The method of claim 13, wherein the first plug enables a first amperage output for the battery module and the second plug enables a second amperage output for the battery module that is half the first amperage output.

15. The method of claim 11, wherein each of the first and second plugs comprises guide members configured to be received within guide slots of the base unit, and wherein the inserting the first or second plug comprises inserting the guide members into their respective guide slots.

16. The method of claim 11, wherein one of the first and second connectors of the first plug comprises a bottom conductive plate having top and bottom surfaces and a pair of recesses formed therein extending between the top surface and bottom surfaces, and wherein the first plug comprises an insulative layer in contact with the top surface of the bottom conductive plate and includes a pair of slots that are aligned with the recesses of the bottom conductive plate, wherein the inserting comprises positioning the bottom surface of the bottom conductive plate against the first and second negative contacts.

17. The method of claim 16, wherein the other of the first and second connectors of the first plug comprises:

a top conductive plate having top and bottom surfaces, wherein the bottom surface is in contact with the insulative layer;

a pair of bottom projections extending downwardly from the bottom surface of the top conductive plate and through the pair of slots of the insulative layer and the pair of recesses of the bottom conductive plate; and a terminal extending from the top surface of the top conductive plate, wherein the inserting comprises positioning the pair of bottom projections against the first and second positive contacts.

18. A battery module comprising the switch assembly of claim 1, the battery module further comprising:

a first collection of battery cells including a positive bus electrically connected to the first positive contact of the base unit and a negative bus associated with the positive bus of the first collection of battery cells and electrically connected to the first negative contact of the base unit;

a second collection of battery cells with a positive bus electrically connected to the second positive contact of the base unit and a negative bus associated with the positive bus of the second collection of battery cells and electrically connected to the second negative contact of the base unit; and a negative terminal configured to electrically connect to one of the negative buses of the collections of battery cells.

19. The battery module of claim 18, wherein the base unit comprises a plurality of leads that extend through the base unit, further comprising positive and negative busbars that connect each of the positive and negative contacts with the respective positive and negative buses of the collections of battery.

20. The battery module of claim 18, wherein the positive and negative buses of the first and second collections of battery cells comprise a plurality of collector plates in contact with terminals of the battery cells.

21. The battery module of claim 18, wherein one of the first and second connectors of the first plug comprises a bottom conductive plate having top and bottom surfaces and a pair of recesses formed therein extending between the top and bottom surfaces, and wherein the first plug comprises an insulative layer in contact with the top surface of the bottom conductive plate and includes a pair of slots that are aligned with the recesses of the bottom conductive plate.

22. The battery module of claim 21, wherein the other of the first and second connectors of the first plug comprises:

a top conductive plate having top and bottom surfaces, wherein the bottom surface of the top conductive plate is in contact with the insulative layer;

a pair of bottom projections extending downwardly from the bottom surface of the top conductive plate and through the pair of slots of the insulative layer and the pair of recesses of the bottom conductive plate; and a terminal extending from the top surface of the top conductive plate and including an indication uniquely associated with the first plug.

23. The battery module of claim 18, wherein:

the second plug comprises an insulative layer with a pair of recesses that align with the first positive contact and the second negative contact when the second plug is inserted into the socket, and the connector of the second plug comprises:

a conductive plate including a bottom surface adjacent to the insulative layer, and a top surface opposite the bottom surface, bottom protrusions extending downwardly from the bottom surface and through the pair of recesses of the insulative layer, and a top protrusion extending from the top surface and including an indication uniquely associated with the second plug.

24. The battery module of claim 18, wherein the base unit comprises a guide slot, and the first and second plugs include guiding members configured to be received into the guide slot.

25. The battery module of claim 18, further comprising:

a battery collection negative junction connected to the negative bus of the second collection of battery cells;

a charge switch configured to allow current to flow from the negative terminal to a common source; and a discharge switch configured to allow current to flow from the battery collection negative junction toward the common source.

26. The battery module of claim 25, wherein the charge switch and the discharge switch each comprise a transistor, further comprising a battery management system in communication with the charge switch and the discharge switch and configured to:

determine whether the first or second collection of battery cells are charging or discharging, direct the charge switch to conduct current when the first and second collections of battery cells are charging, and direct the discharge switch to conduct current when the first and second collections of battery cells are discharging.

27. The battery module of claim 18, wherein the base unit further comprises a plurality of biasing members configured to upwardly bias the contacts.

28. The battery module of claim 18, further comprising a battery module housing that encloses the first and second collections of battery cells.

29. The battery module of claim 28, wherein the battery module housing comprises an open top container and an attachable lid with two or more access holes, wherein portions of the negative terminal and one of the first or second plugs extend through the access holes.

30. The battery module of claim 29, wherein the lid is hermetically sealed to the container.

31. The battery module of claim 29, further comprising a pressure relief vent installed on the battery module housing.

* * * * *